United States Patent
Bove, Jr.

(10) Patent No.: US 12,058,513 B2
(45) Date of Patent: Aug. 6, 2024

(54) SPATIAL AUDIO CUES FOR AUGMENTED REALITY APPLICATIONS

(71) Applicant: Rovi Guides, Inc., San Jose, CA (US)

(72) Inventor: V. Michael Bove, Jr., Wrentham, MA (US)

(73) Assignee: Rovi Guides, Inc., San Jose, CA (US)

( * ) Notice: Subject to any disclaimer, the term of this patent is extended or adjusted under 35 U.S.C. 154(b) by 144 days.

(21) Appl. No.: 17/694,405

(22) Filed: Mar. 14, 2022

(65) Prior Publication Data
US 2023/0292078 A1 Sep. 14, 2023

(51) Int. Cl.
*G06F 3/04815* (2022.01)
*G02B 27/01* (2006.01)
*H04S 7/00* (2006.01)

(52) U.S. Cl.
CPC ............ *H04S 7/304* (2013.01); *G02B 27/017* (2013.01); *G06F 3/04815* (2013.01); *G02B 2027/014* (2013.01); *H04S 2420/01* (2013.01)

(58) Field of Classification Search
CPC ............................ H04S 7/304; H04S 2420/01
See application file for complete search history.

(56) References Cited

U.S. PATENT DOCUMENTS

2012/0206452 A1* 8/2012 Geisner .................. G06F 3/013
    345/419
2021/0019109 A1* 1/2021 Smith .................. H04R 1/1041

* cited by examiner

*Primary Examiner* — Ping Lee
(74) *Attorney, Agent, or Firm* — Haley Guiliano LLP

(57) ABSTRACT

Systems and methods are provided herein for providing spatial audio cues for notifying a user of a user interface ("UI") element in augmented reality ("AR"). This may be accomplished by a system determining a location and orientation of a device, and then determining an estimated augmented reality view using the location and orientation of the device. The system may then determine whether a UI element is within the augmented reality view. If the UI element is within the augmented reality view, the system can play an audio cue signaling a position of the UI element using audio spatialization. After hearing the audio cue, the user may then view the UI element in AR using the device.

18 Claims, 11 Drawing Sheets

150

170

SPATIAL AUDIO CUES FOR AUGMENTED REALITY APPLICATIONS

BACKGROUND

The present disclosure relates to augmented reality, and in particular to techniques for alerting a user of a user interface element located in augmented reality.

SUMMARY

Augmented reality ("AR") involves overlaying visual information using a display (e.g., AR headset display, smartphone display, etc.) such that when a user looks through the display, the user perceives their surroundings with interactive user interface ("UI") elements (e.g., selectable or interactive icons, media content, etc.). AR overlays comprise content and information with respect to attributes of the physical environment surrounding the user. AR devices and overlays paired together enable devices to enhance a user's experience with media content such that the user experiences their surroundings and content simultaneously. An AR overlay enables the user to view the real world with an additional interactive layer of digital information projected into it (e.g., the overlay may be at least partially transparent to enable a user to remain aware of their surroundings while consuming content). The AR overlay may comprise two-dimensional or three-dimensional virtual icons as part of an interactive interface within the user's field of view (e.g., using an AR headset or a screen of a device enabled to present video corresponding to the user's surroundings). However, most users do not wear AR headsets for extended periods of time, nor do they walk around constantly viewing their environment using the screen of their device. Accordingly, users can often miss the presence of relevant UI elements. This sub-optimal user experience can lead to frustrated users as well as frustrated AR overlay creators. In view of these deficiencies, there exists a need for improved systems and methods for notifying users of relevant UI elements in AR.

Accordingly, techniques are disclosed herein for using spatial audio cues for notifying a user of a UI element in AR. As a result, these techniques may be implemented to address the previously described problem of a user missing interesting or relevant experiences or UI elements in an AR interface because they are not constantly viewing their AR interface. As described herein, one methodology for notifying a user of a UI element in AR leverages audio output devices (e.g., in-ear headphones, on-ear headphones, over-ear headphones, speakers, etc.) and audio cues. For example, users often use audio output devices as they go about their daily lives (e.g., even when not wearing their AR headset or looking at their AR interface on their phone). When a UI element is near the user, the audio output devices can play a notification signaling that the user can view a UI element if they access their AR device (e.g., a headset or phone configured to provide an AR interface). Notifying the user using the audio output devices gives the user the option to access UI elements without having to constantly view an AR display. Audio output devices are often in communication with other devices (e.g., a smartphone), which allows the audio output devices to output media content. The device in communication with the audio output device can use location services (e.g., global positioning systems, proximity to known wireless access points, etc.) to determine a location of the device. The device can also use orientation information (e.g., position of the audio output device, data from an accelerometer, data from a compass sensor, location data, etc.) to determine an orientation. The orientation may correspond to an orientation of one of the devices and/or the orientation of the user. For example, using the location of an audio output device (e.g., over-ear headphones) can allow the device to determine which way a user's head is facing. The device can then use the determined location and orientation to determine or estimate an augmented reality view. In some embodiments, a reference to an "augmented reality view" determined based on location and/or orientation may be understood as an "estimated augmented reality view" rather than a currently active and rendered augmented reality view. That is, the augmented reality view may correspond to the view that an AR device would display for a user viewing AR at the location and orientation. The device may access augmentation data comprising UI elements located at different positions in relation to the location of the device. Using the determined augmented reality view and the augmentation data, the device can determine if a UI element would be visible if the user was viewing AR at the determined location and orientation. The device may also use two-dimensional ("2D") and/or three-dimensional ("3D") mapping data when determining the augmented reality view. The 2D and/or 3D mapping data can help determine if the UI element would be visible if the user was viewing AR at the determined location and orientation. For example, the device may use 3D mapping data to determine that although a UI element is in front of a user, the UI element is not visible to the user because there is a building in between the user and the UI element.

If the device determines that the UI element is visible in the augmented reality view, the device can use the location and orientation (e.g., of the device itself or of the audio output device) in conjunction with the augmentation data to determine a direction and/or position of the UI element in relation to the location and orientation (which may correspond to the augmented reality view). The device can then use audio spatialization to generate an audio cue coming from the direction of the UI element, signaling the direction of the UI element. For example, the device may determine that a UI element is visible in the left side of the augmented reality view and generate an audio cue for the audio output device coming from the direction (e.g., left side of the augmented reality view) of the UI element. When the user hears the audio cue, the user perceives the audio cue as coming from in front of and to the left of the user, signaling the presence of the UI element. The user may then take out their AR device to view the UI element. In an embodiment, the device additionally or alternatively determines a distance to the UI element. For example, the device may determine a vector (which includes distance and direction components) from the location and orientation of the device or audio output device to the UI element. In an embodiment, the audio cue may indicate distance as well as, or instead of, direction. For example, the volume of the audio cue may indicate distance, such that the cue gets louder as the person approaches the position of the UI element.

If the device determines that the UI element would not be visible in the augmented reality view, the device can use the location and orientation in conjunction with the augmentation data to determine a direction of the UI element in relation to the augmented reality view. The device may also leverage two-dimensional mapping models, three-dimensional mapping models, machine vision, and/or similar such mapping techniques to determine the direction of the UI element in relation to the augmented reality view. The device can then use audio spatialization to generate an audio cue coming from the direction of the UI element, signaling the direction of the UI element. For example, the device may determine that a UI element is visible to the right of the augmented reality view and generate an audio cue for the audio output device coming from the direction (e.g., to the right) of the UI element. When the user hears the audio cue, the user perceives the audio cue as coming from the right of the user, signaling the presence of the UI element. The user may then turn in the direction of the audio cue and take out their AR device to view the UI element.

Using the augmented reality view in conjunction with the augmentation data, the device may determine that the visibility of the UI element is better from a second augmented reality view located at a different location than the first augmented reality view. For example, the device may determine that a UI element is not visible or slightly visible from the augmented reality view at a first location but would be totally visible if the user walked ten feet to the west. The device may lead the user to the second location using an audio cue. For example, the audio cue may give the user instructions (e.g., "Walk ten feet to your left"). The audio cue may be a tone, music, etc., coming from the direction of the second location, wherein the volume of the audio cue increases as the user approaches the second location, thereby communicating to the user a relative distance to the second location. The device may also display a graphic on a display of the device indicting the second location. The device may also leverage mapping techniques to determine a path to the second location with the second augmented reality view where the visibility of UI element is improved. For example, the device may determine that the UI element is visible from three different augmented reality views at three different locations and select the location that is the shortest distance from the current location of the device. In another example, the device may select the location that may not be the shortest distance from the current location of the device but may be safer (e.g., the third location is on the sidewalk while the second location is in the street). In an embodiment, a user may adjust one or more settings to indicate a preference for mode of transportation, which the device may account for when selecting a location. The settings may indicate a preference for walking, biking, driving, taking a train, flying, etc. The device may select a location from which a UI element is viewable from a rail line, for example. In another example, the device may select the location with the best visibility of the UI element.

The device may store preferences for a profile, wherein the preferences relate to the UI elements, audio cues, mode of transportation, etc. For example, a profile may indicate a first preference for UI elements related to a product (e.g., shoes, clothes, etc.). The device may only generate audio cues for UI elements related to the product and ignore UI elements that are not related to the product. In another example, a second preference may indicate a preferred audio cue type (e.g., words, tone, etc.). The device may only generate audio cues of the certain type for the user based on the second preference.

BRIEF DESCRIPTION OF THE DRAWINGS

The below and other objects and advantages of the disclosure will be apparent upon consideration of the following detailed description, taken in conjunction with the accompanying drawings in which.

DETAILED DESCRIPTION

Figure 1A:
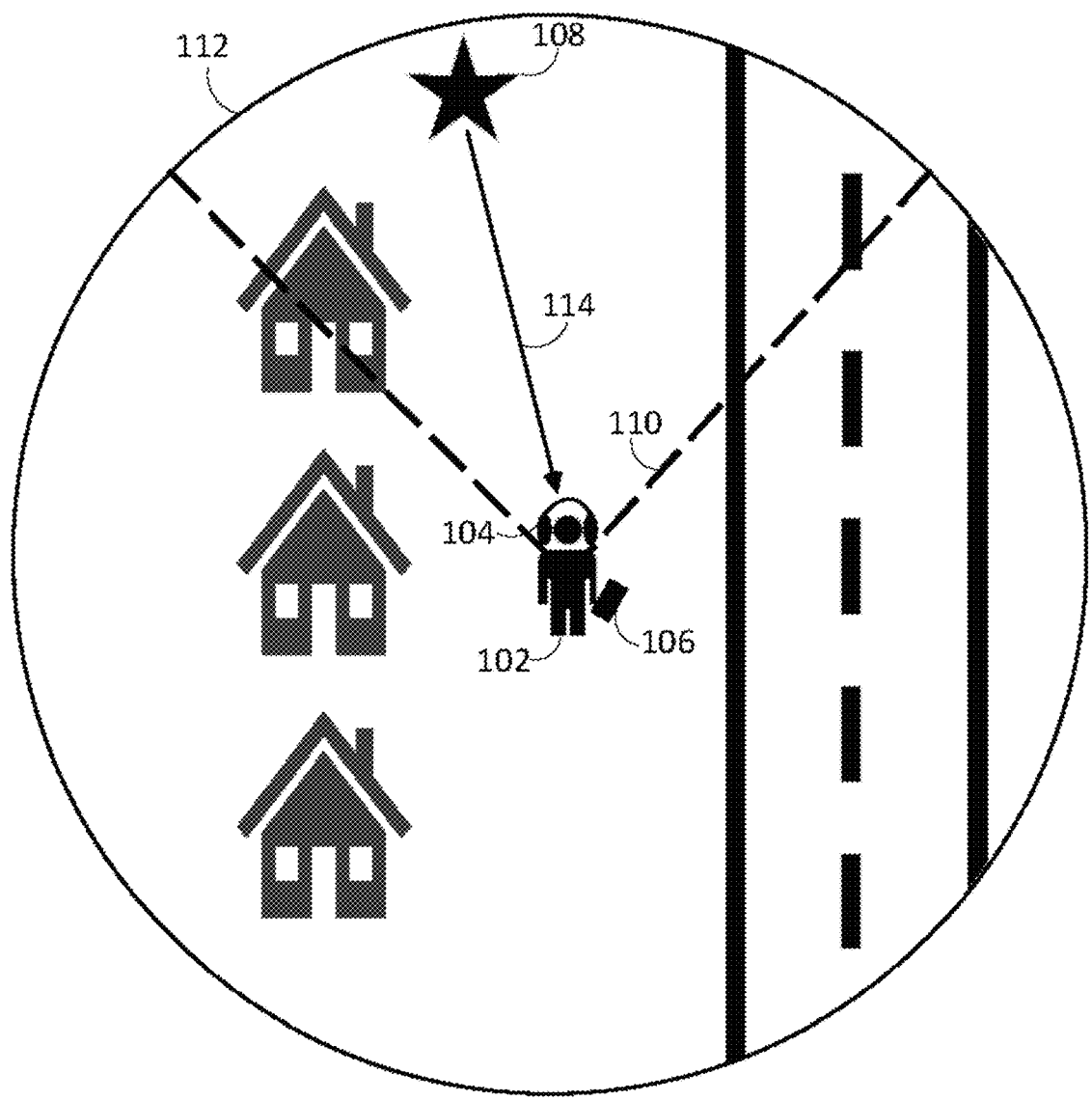
FIGS. 1A-1C shows an illustrative diagram of a system for using spatial audio cues for notifying a user of a UI element in AR, in accordance with some embodiments of the disclosure.

FIG. 1A shows an illustrative diagram of a system 100 for using spatial audio cues for notifying a user 102 of a UI element 108 in AR, in accordance with some embodiments of the disclosure. System 100 includes a user 102 with an audio output device 104. The audio output device 104 is displayed as on-ear headphones but any audio output device may be used. In some embodiments, the audio output device 104 is in communication with a user equipment device 106. The user equipment device 106 may be a smartphone, tablet, laptop, or similar such device. In some embodiments, the audio output device 104 and the user equipment device 106 may be the same device. In some embodiments, the audio output device 104 outputs media content to the user 102. In some embodiments, functions performed by the user equipment device 106 may be performed by the audio output device and vice versa.

In some embodiments, the user equipment device 106 uses location services (e.g., machine vision, global positioning systems, proximity to known wireless access points, etc.) to determine a location of the user equipment device 106. In some embodiments, the user equipment device 106 uses orientation information (e.g., position of the audio output device, data from an accelerometer, data from a compass sensor, location data, etc.) to determine an orientation. The orientation may correspond to an orientation of the audio output device 104, the user equipment device 106 and/or the orientation of the user 102. For example, using the orientation of the audio output device 104 the user equipment device can determine which way the user 102 is facing. In another example, the user equipment device 106 may determine (e.g., using a global positing system) that the user 102 is traveling in a direction (e.g., north). The user equipment device 106 may assume the orientation of the user 102 (e.g., facing north) based on the determined direction.

In some embodiments, the user equipment device 106 uses the determined location and orientation to estimate an augmented reality view 110. The augmented reality view 110 corresponds to the view that an AR device would display for the user 102 when the user 102 views AR at the location and orientation. In some embodiments, the audio output device 102 and/or the user equipment device 106 are AR devices. In some embodiments, the AR device is an AR headset (not shown).

In some embodiments, the user equipment device 106 uses augmentation data comprising a UI element 108 located at a first position. In some embodiments, the augmentation data comprises a plurality of UI elements. In some embodiments, the user equipment device 106 receives the augmentation data from a server and/or an AR device. In some embodiments, the augmentation data is stored on the user equipment device 106. In some embodiments, the user equipment device 106 uses the position of the UI element 108 and the augmented reality view 110 to determine if the UI element 108 is within the augmented reality view 110. In some embodiments, the augmented reality view 110 has a distance threshold. For example, if the UI element 108 is not within a distance 112 of the user 102 the user equipment device 106 determines that the UI element 108 is not within the augmented reality view 110 even if the UI element 108 is in front of the user 102.

In some embodiments, if the user equipment device 106 determines that the UI element 108 is within the augmented reality view 110, the user equipment device 106 uses the determined location and orientation in conjunction with the augmentation data to determine a direction 114 of the UI element 108 in relation to the determined location and orientation (and thereby in relation to the augmented reality view 110). The user equipment device 106 can then use audio spatialization to generate an audio cue coming from the direction 114 of the UI element 108, signaling the position of the UI element 108. In some embodiments, the user equipment device 106 may apply directional audio filtering to create the perception that the audio cue is emanating from the position of the UI element 108. For example, the user equipment device 106 may convert the location and/or orientation used to generate the augmented reality view 110 into a location in a 3D audio field. The user equipment device 106 may also convert the position of the UI element 108 into the 3D audio field. The user equipment device 106 can then use an audio spatialization algorithm to place the audio cue at the position of the UI element 108 and calculate a vector (e.g., direction 114) emanating from the UI element 108 to the user 102. For example, if the user 102 is at position $(x_1, y_1, z_1)$ and the UI element is at $(x_2, y_2, z_2)$, a normal vector between them may be calculated as $(x_2-x_1, y_2-y_1, z_2-z_1)/|(x_2-x_1, y_2-y_1, z_2-z_1)|$, the difference between the locations divided by its magnitude.

In some embodiments, the audio spatialization is calculated using an AR software application programming interface ("API") or Software development kit ("SDK"). In some embodiments, the audio cue is associated with a 3D location in a 3D model of the UI element 108 in a scene graph. In some embodiments, the user equipment device 106 only generates the audio cue when the user equipment device 106 determines that the UI element 108 is within the augmented view and the audio spatialization is calculated as part of the audio rendering. For example, an audio cue may be given a position corresponding to the location of the UI element 108 with which the audio cue is associated. The audio cue can be rendered such that the audio cue comes from the direction 114 of the UI element 108 to the user.

In some embodiments, the audio output device 104 plays the audio cue. In some embodiments, the audio cue is a tone, music, word, etc. In some embodiments, the audio output device 104 plays an audio cue (e.g., tone) coming from the left because the UI element 108 is located on the left side of the augmented reality view 110. In some embodiments, the user 102 hears the audio cue and perceives the audio cue as coming from the direction 114, signaling the presence of the UI element 108. In some embodiments, the user 102 uses an AR device to view the UI element 108. In some embodiments, the user equipment device 106 stores preferences for a profile, wherein the preferences relate to UI elements, audio cues, mode of transportation, etc. For example, a profile may indicate a first preference for UI elements related to a product (e.g., shoes, clothes, etc.). In some embodiments, the user equipment device 106 only generates audio cues for UI elements related to the preferred product and ignores UI elements that are not related to the preferred product. In another example, a second preference may indicate a preferred audio cue type (e.g., words, tone, etc.). In some embodiments, the user equipment device 106 only generates audio cues of the certain type for the user 102 based on the second preference.

Figure 1B:
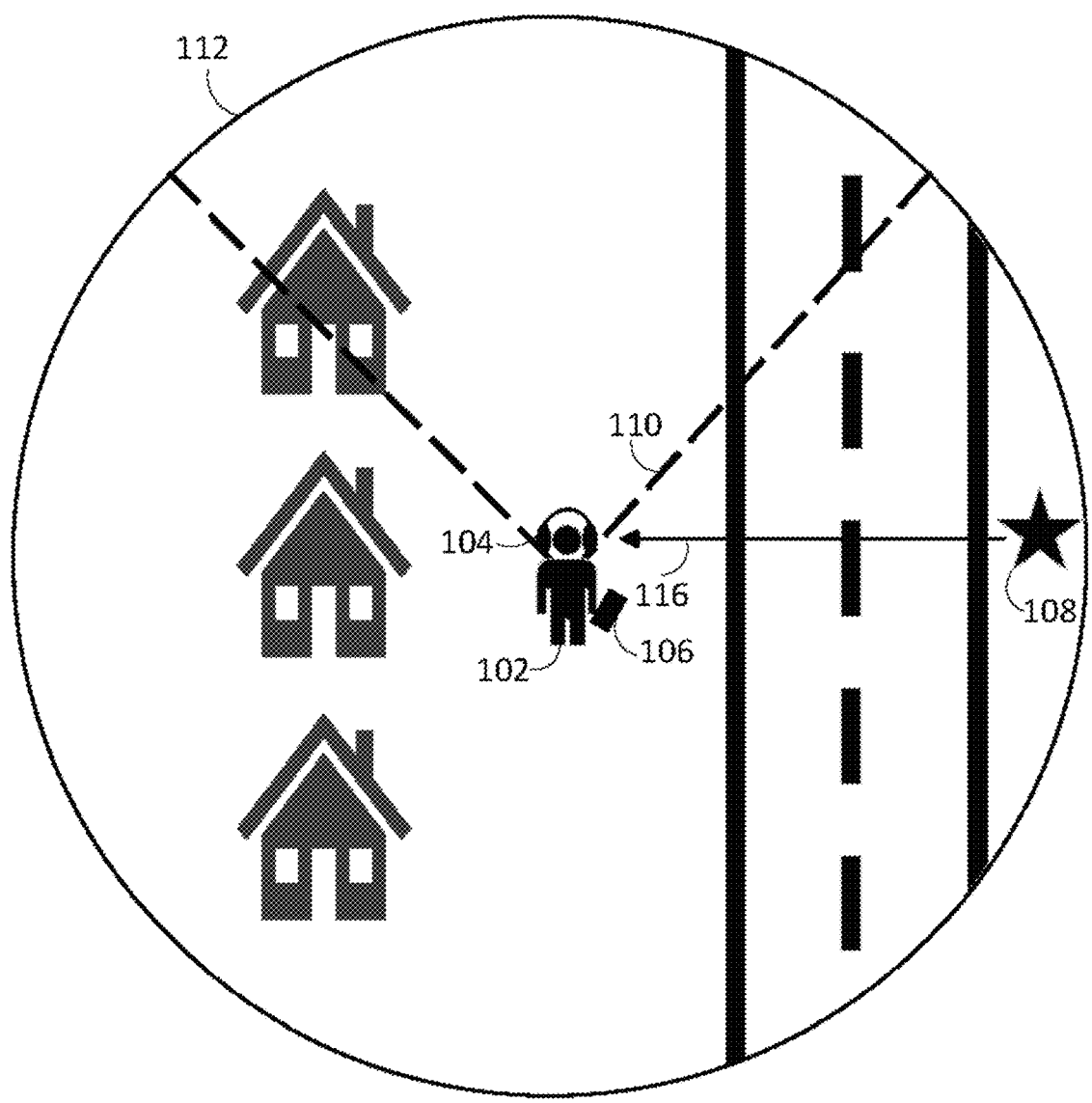

FIG. 1B shows an illustrative diagram of a system 150 for using spatial audio cues for notifying a user 102 of a UI element 108 in AR, in accordance with some embodiments of the disclosure. In some embodiments, FIG. 1B uses the same or similar methodologies described in FIG. 1A above. In some embodiments, FIG. 1B is the same as FIG. 1A except the UI element 108 is located in a different position. In some embodiments, the user equipment device 106 uses location services to determine a location of the user equipment device 106 and orientation information to determine an orientation, as described above. The orientation may correspond to an orientation of the audio output device 104, the user equipment device 106 and/or the orientation of the user 102. In some embodiments, the user equipment device 106 accesses augmentation data comprising the UI element 108 located at a second position. In some embodiments, the user equipment device 106 uses the second position of the UI element 108 and the augmented reality view 110 to determine if the UI element 116 is within the augmented reality view 110.

In some embodiments, if the user equipment device 106 determines that the UI element 108 is not located within the augmented reality view 110, the user equipment device 106 uses the determined location and orientation in conjunction with the augmentation data to determine a direction 116 of the UI element 108 in relation to the augmented reality view 110. The user equipment device 106 can then use audio spatialization to generate an audio cue coming from the direction 116 of the UI element 108, signaling the position the UI element 108. In some embodiments, the user equipment device 106 uses any of the techniques described herein to generate an audio cue coming from the direction 116 of the UI element 108. In some embodiments, the user equipment device 106 determines that the UI element 108 is to the right of the augmented reality view 110 and generates an audio cue for the audio output device 104 coming from the direction 116 (e.g., from the right) of the UI element 108. In some embodiments, the audio output device 104 plays the audio cue for user 102. In some embodiments, the user 102 hears the audio cue and perceives the audio cue as coming from the direction 116 (e.g., from the right) of the UI element 108, signaling the presence of the UI element 108. In some embodiments, the audio output device 104 controls a volume of the audio cue to indicate distance to the UI element 108. In some embodiments, the audio output device 104 may provide the cue in a manner to indicate a trend (e.g., to indicate that the user is getting closer or further away from the UI element 108). For example, a falling pitch may indicate that the user is getting farther away, and a rising pitch may indicate that the user is getting closer. In some embodiments, the user 102 turns toward the UI element 108 (e.g., to the right) and uses an AR device to view the UI element 108.

Figure 1C:
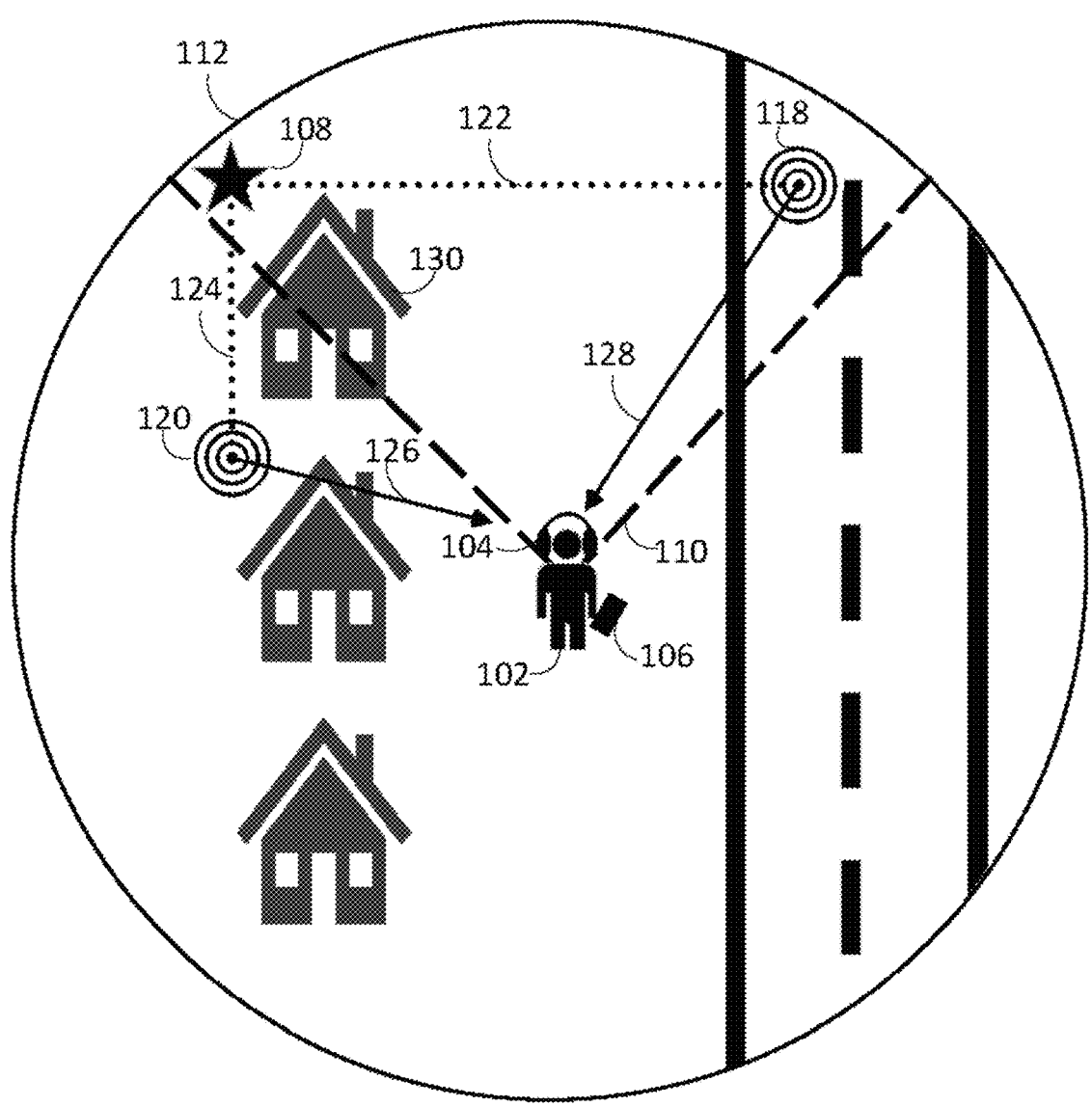

FIG. 1C shows an illustrative diagram of a system 170 for using spatial audio cues for notifying a user 102 of a UI element 108 in AR, in accordance with some embodiments of the disclosure. In some embodiments, FIG. 1C uses the same or similar methodologies described in FIGS. 1A and 1B above. In some embodiments, FIG. 1C is the same as FIG. 1A except the UI element 108 is located in a different position. In some embodiments, the user equipment device 106 uses location services to determine a location of the user equipment device 106 and orientation information to determine an orientation, as described above. The orientation may correspond to an orientation of the audio output device 104, the user equipment device 106 and/or the orientation of the user 102. In some embodiments, the user equipment device 106 accesses augmentation data comprising the UI element 108 located at a third position. In some embodiments, the user equipment device 106 uses the third position of the UI element 108 and the augmented reality view 110 to determine if the UI element 108 is within the augmented reality view 110.

In some embodiments, the user equipment device 106 uses two-dimensional ("2D") and/or three-dimensional ("3D") mapping data when determining the augmented reality view 110. For example, the user equipment device 106 may map the position and/or orientation of the device 106 or the audio output device 104 in 2D or 3D space. The device 106 may map the position of the UI element 108 in 2D or 3D space. The device 106 may rely on mapping data to identify other map objects (e.g., buildings, streets, walls, paths, sidewalks, points-of-interest, etc.) that may be (i) relevant to the orientation and/or position of the device 106, the audio output device 104, and/or the UI element 108, and/or (ii) relevant to a notification or routing calculation that might be used to provide an audio cue to notify a user of a direction, distance, and/or path to the UI element 108. In some instances, one or more map objects may affect an estimated augmented reality view and/or a path to an augmented reality view. Accordingly, the device 106 may account for such map objects when determining how to guide a user to the UI element 108 (thus impacting the manner in which audio cues are provided to indicate direction or distance to the UI element 108). In some embodiments, the user equipment device 106 uses the 2D and/or 3D mapping data to determine the visibility of the UI element 108. In some embodiments, the user equipment device 106 uses the 2D and/or 3D mapping data to determine that the UI element 108 is within the augmented reality view 110 but is not visible from the determined location and orientation because an object 130 (e.g., building) is located between the location and the UI element. For example, the user equipment device 106 may use 3D mapping data and the location of the UI element 108 to map the object 130 and UI element 108 in 3D space then determine the UI element 108 is not visible from the viewpoint of the user 102. In another example, the user equipment device 106 may assume that the user is at or near ground level and use 2D mapping data to determine that the object 130 is between the UI element 108 and the user 102. The user equipment device 106 can then use that determination to determine that the UI element 108 is not visible to the user 102. In some embodiments, the user equipment device 106 receives the 2D and/or 3D mapping data from a server and/or an AR device. In some embodiments, the 2D and/or 3D mapping data is stored on the user equipment device 106.

In some embodiments, the user equipment device 106 uses the 2D and/or 3D mapping data to determine a set of coordinates for the position of the UI element 108. The user equipment device 106 can use the coordinates to determine whether the position of the UI element 108 is within the augmented reality view 110 of the determined location and orientation. The user equipment device 106 can then use audio spatialization to generate an audio cue coming from the position of the UI element 108, signaling the position the UI element 108. In some embodiments, the 2D and/or 3D mapping data comprises the information used to determine the position (e.g., coordinates) of the UI element. In some embodiments, the user equipment device 106 calculates a direction from the determined location to the UI element 108. The user equipment device 106 can calculate a relative direction from the augmented reality view 110 using the determined orientation and the calculated direction. In some embodiments, the direction and/or relative direction are associated with magnitudes. For example, the closer the UI element 108 is to the determined location, the larger the magnitude of the direction. The user equipment device 106 can then use audio spatialization to generate an audio cue coming from the relative direction of the UI element 108. In some embodiments, the larger the magnitude of the relative direction the louder the audio cue. In some embodiments, the direction and/or relative direction are determined without knowing the coordinates of the UI element.

In some embodiments, the user equipment device 106 uses the 2D and/or 3D mapping data to determine that the UI element 108 is not visible in the augmented reality view 110 from the location and orientation used to determine the augmented reality view 110. In some embodiments, the user equipment device 106 uses the 2D and/or 3D mapping data to determine that the UI element 108 is visible (e.g., first unobstructed view 122 between a second location 118 and the UI element 108) from a second augmented reality view located at the second location 118. In some embodiments, the user equipment device 106 determines a plurality of augmented reality views where the UI element 108 is visible and selects the second augmented reality view located at the second location 118. In some embodiments, the user equipment device 106 makes the selection based on one or more factors. The one or more factors may include distance from the user 102, visibility of the UI element 108 at the second location 118, safety of the second location 118, proximity to services (shops, hotels, transit, etc.), ease of accessibility of the second location 118, user input (e.g., previous users giving positive feedback related to the second location 118), and similar such factors.

In some embodiments, the user equipment device 106 directs the user 102 to the second location 118. In some embodiments, the user equipment device 106 uses mapping techniques to determine a path to the second location 118. In some embodiments, the user equipment device 106 generates instructions corresponding to the determined path. For example, the user equipment device 106 may generate an audio cue giving the user instructions (e.g., "Walk ten feet forward and five feet to your right"). In some embodiments, the user equipment device 106 uses audio spatialization, as described above, to generate the audio que from the direction 128 of the second location 118. In some embodiments, the user equipment device 106 displays a graphic on a display of the user equipment device 106 indicting the second location 118.

In some embodiments, the user equipment device 106 uses the 2D and/or 3D mapping data to determine that the UI element 108 is visible (e.g., second unobstructed view 124 between a third location 120 and the UI element 108) from a third augmented reality view located at the third location 120. In some embodiments, the user equipment device 106 determines the third augmented reality view located at the third location 120 in response to determining that the second location 118 was not safe. For example, the user 102 may be able to travel to the second location 118 faster than the third location 120, but the second location 118 is in the street. In some embodiments, the user equipment device 106 determines the third augmented reality view located at the third location 120 in response to the user 102 requesting an additional location. In some embodiments, the user equipment device 106 uses audio spatialization as described above to generate an audio que from the direction 126 of the third location 120. In some embodiments, the user equipment device 106 displays a graphic on a display of the user equipment device 106 indicting the third location 120.

In some embodiments, the user equipment device 106 uses the 2D and/or 3D mapping data to calculate a visibility score of the UI element 108 for different augmented reality views. In some embodiments, the visibility score represents the visibility of the UI element 108 in an augmented reality view from the location and orientation used to determine the augmented reality view. For example, if the entire UI element 108 if visible from the location and orientation the user equipment device 106 would calculate a high visibility score. In another example, if the entire UI element 108 if not visible or only partly visible from the location and orientation the user equipment device 106 would calculate a low visibility score. In some embodiments, the user equipment device 106 generates audio cues based on the confidence score. For example, if the user equipment device 106 calculates a high visibility score, the user equipment device 106 may generate an audio cue similar to FIG. 1A. If the user equipment device 106 calculates a low visibility score, the user equipment device 106 may generate an audio cue from different locations (e.g., second location 118 and third location 120) as displayed in FIG. 1C.

Figure 2A:
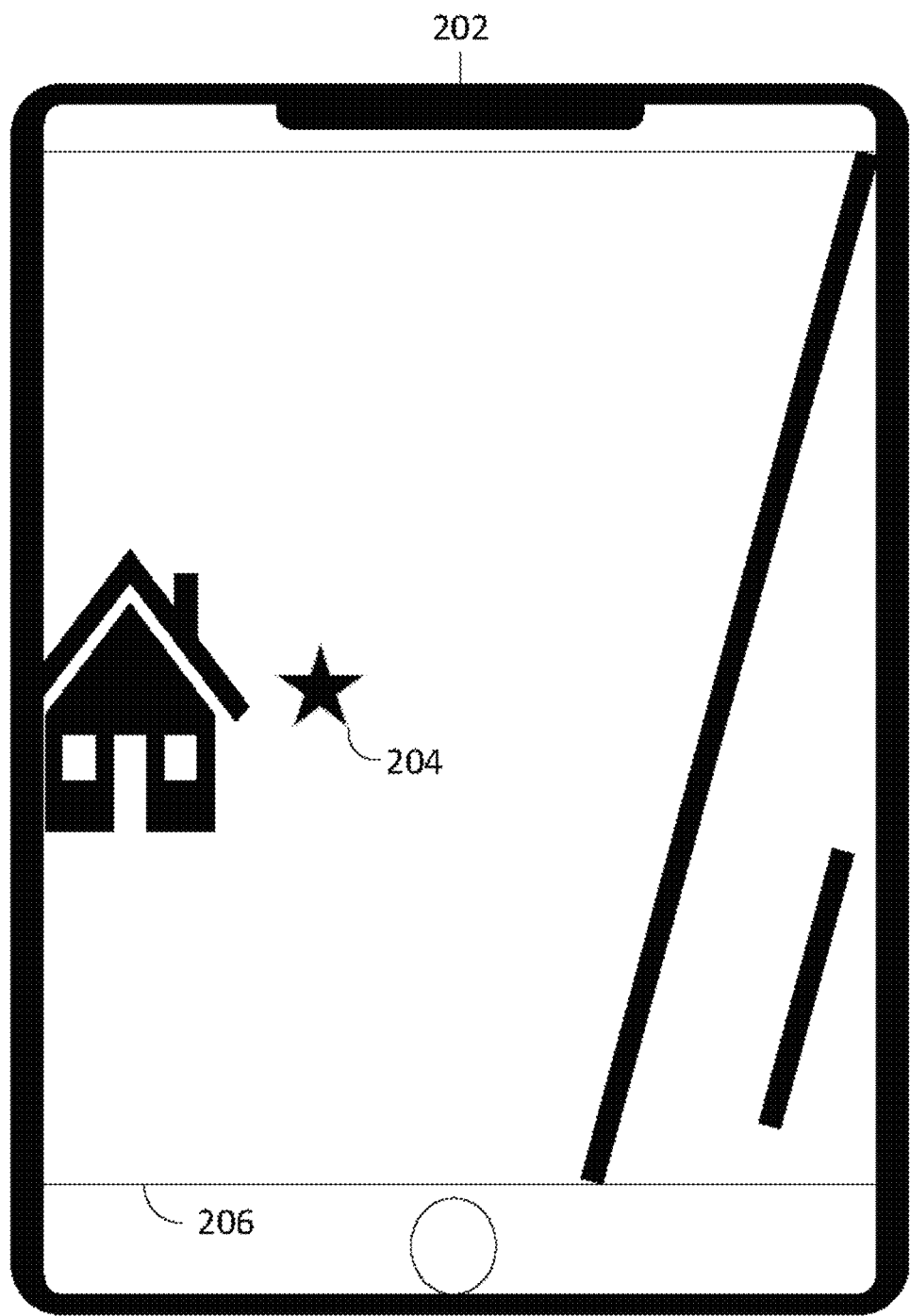
FIGS. 2A-2C shows an AR device displaying AR, in accordance with some embodiments of the disclosure.

FIG. 2A shows an AR device 202 displaying AR, in accordance with some embodiments of the disclosure. Although the AR device 202 is illustrated as a smartphone, any device capable of displaying AR may be used. In some embodiments, the AR device 202 may be the same or similar as the user equipment device 106 described in FIGS. 1A-1C. In some embodiments, the AR device 202 displays an augmented reality view 206 comprising a UI element 204. In some embodiments, the UI element 204 is the same or similar UI element described in FIGS. 1A-1C. In some embodiments, the augmented reality view 206 is the same or similar augmented reality view 110 described in FIG. 1A.

Figure 2B:
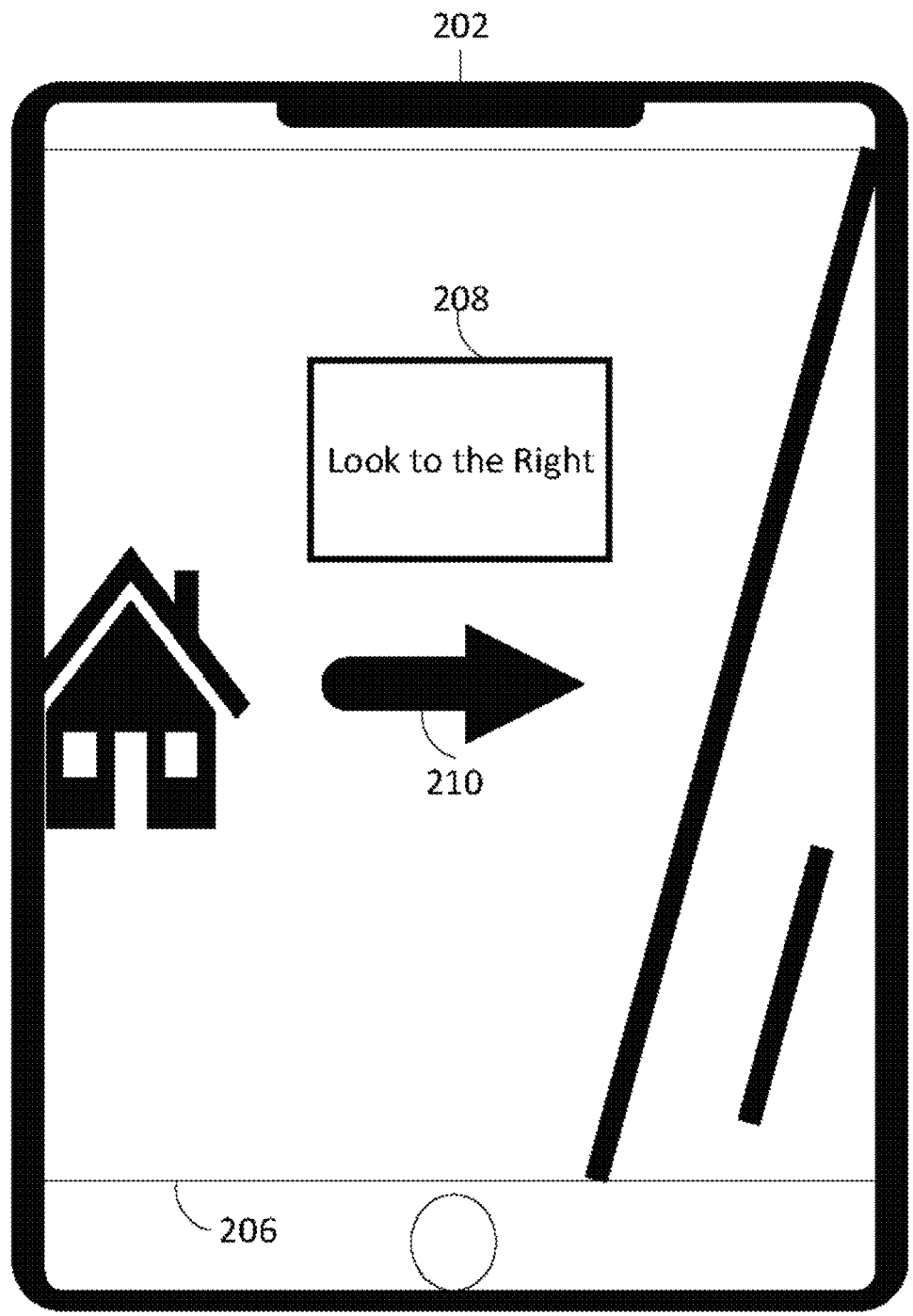

FIG. 2B shows the AR device 202 displaying AR, in accordance with some embodiments of the disclosure. In some embodiments, the augmented reality view 206 comprises a first graphic 208 and a second graphic 210 indicating the location of a UI element. In some embodiments, only one of the two graphics are displayed. In some embodiments, the AR device 202 displays the first graphic 208 and second graphic 210 after determining a UI element is within a threshold distance and is not located within the augmented reality view 206. In some embodiments, the augmented reality view 206 of FIG. 2B represents the augmented reality view 110 described in FIG. 1B after the determination that the UI element 108 is not located within the augmented reality view 110. In some instances, the augmented reality view 206 is rendered or displayed after the user has activated an AR interface (e.g., in response to receiving audio cues).

Figure 2C:
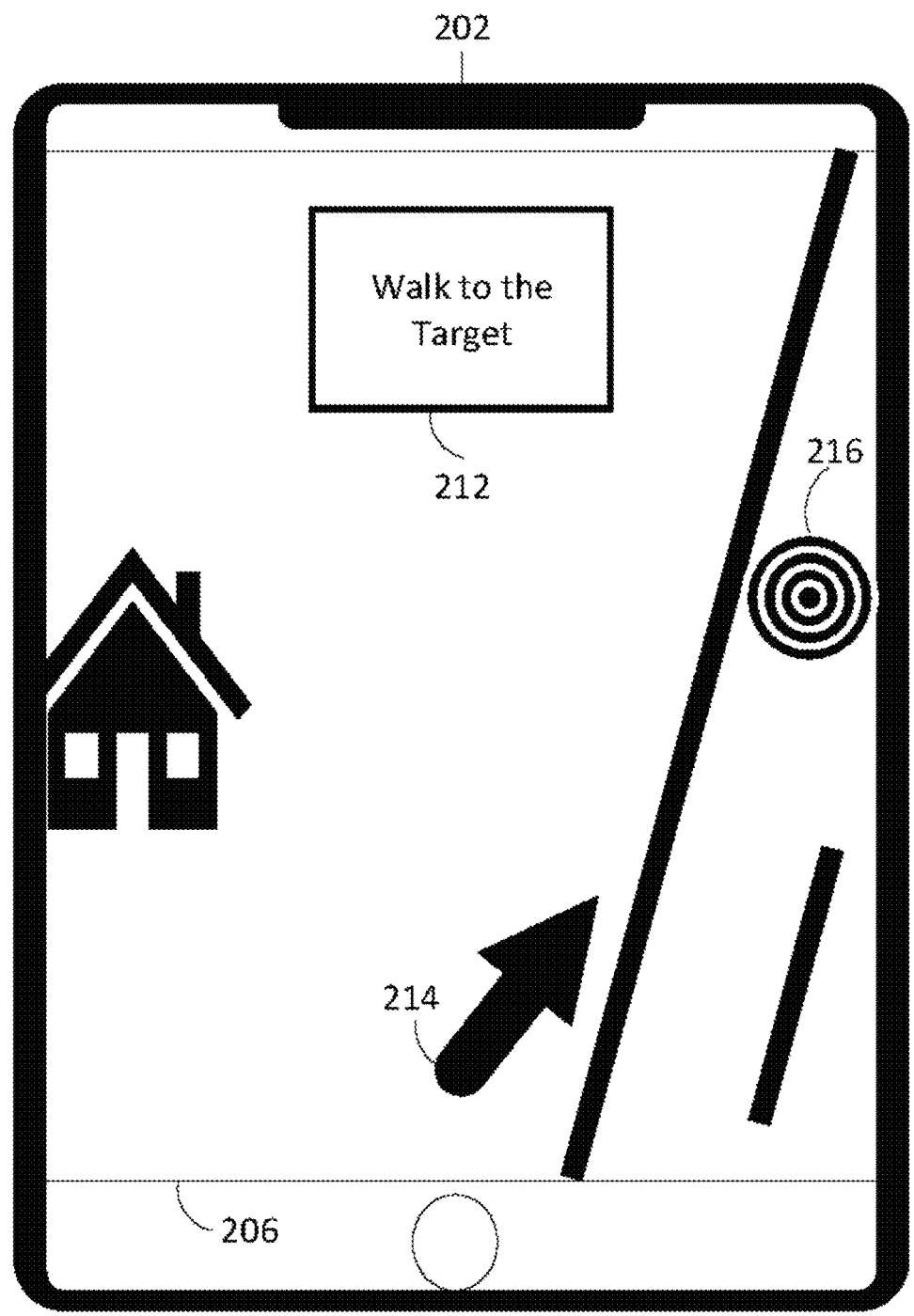

FIG. 2C shows the AR device 202 displaying AR, in accordance with some embodiments of the disclosure. In some embodiments, the augmented reality view 206 comprises a third graphic 212 and a fourth graphic 214 indicating the location of a different location 216 were a UI element is visible. In some embodiments, only one of the two graphics are displayed. In some embodiments, the AR device 202 displays the third graphic 212, the fourth graphic 214, and the different location 216 after determining a UI element is not visible within the augmented reality view 206. In some embodiments, the different location 216 corresponds to the second location of FIG. 1C. In some embodiments, the different location 216 is calculated using any of the methodologies described above. In some embodiments, the augmented reality view 206 of FIG. 2C represents the augmented reality view 110 described in FIG. 1C after the determination that the UI element 108 is not visible within the augmented reality view 110.

Figure 3:
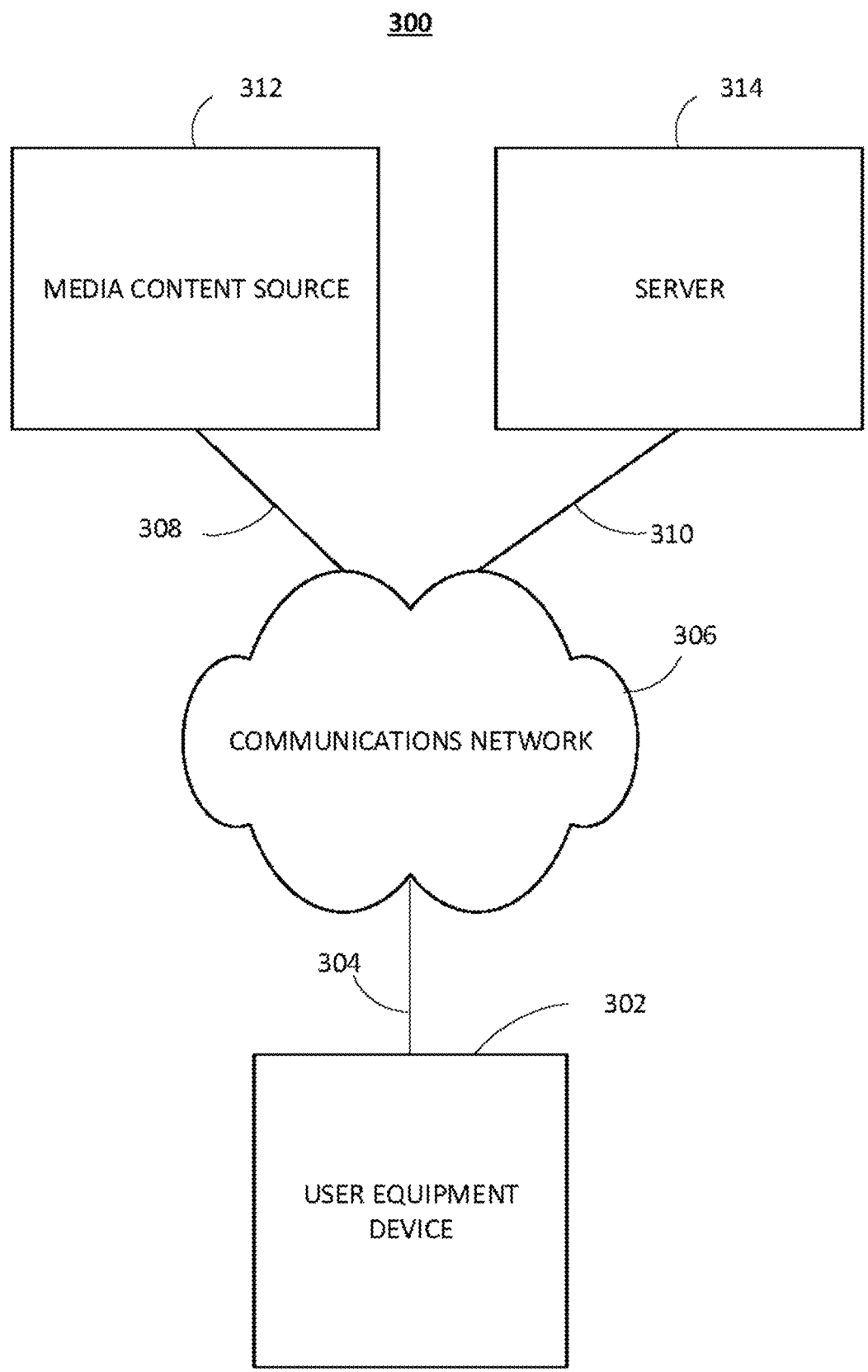
FIG. 3 shows an illustrative block diagram of a system for using spatial audio cues for notifying a user of a UI element in AR, in accordance with some embodiments of the disclosure.
Figure 4:
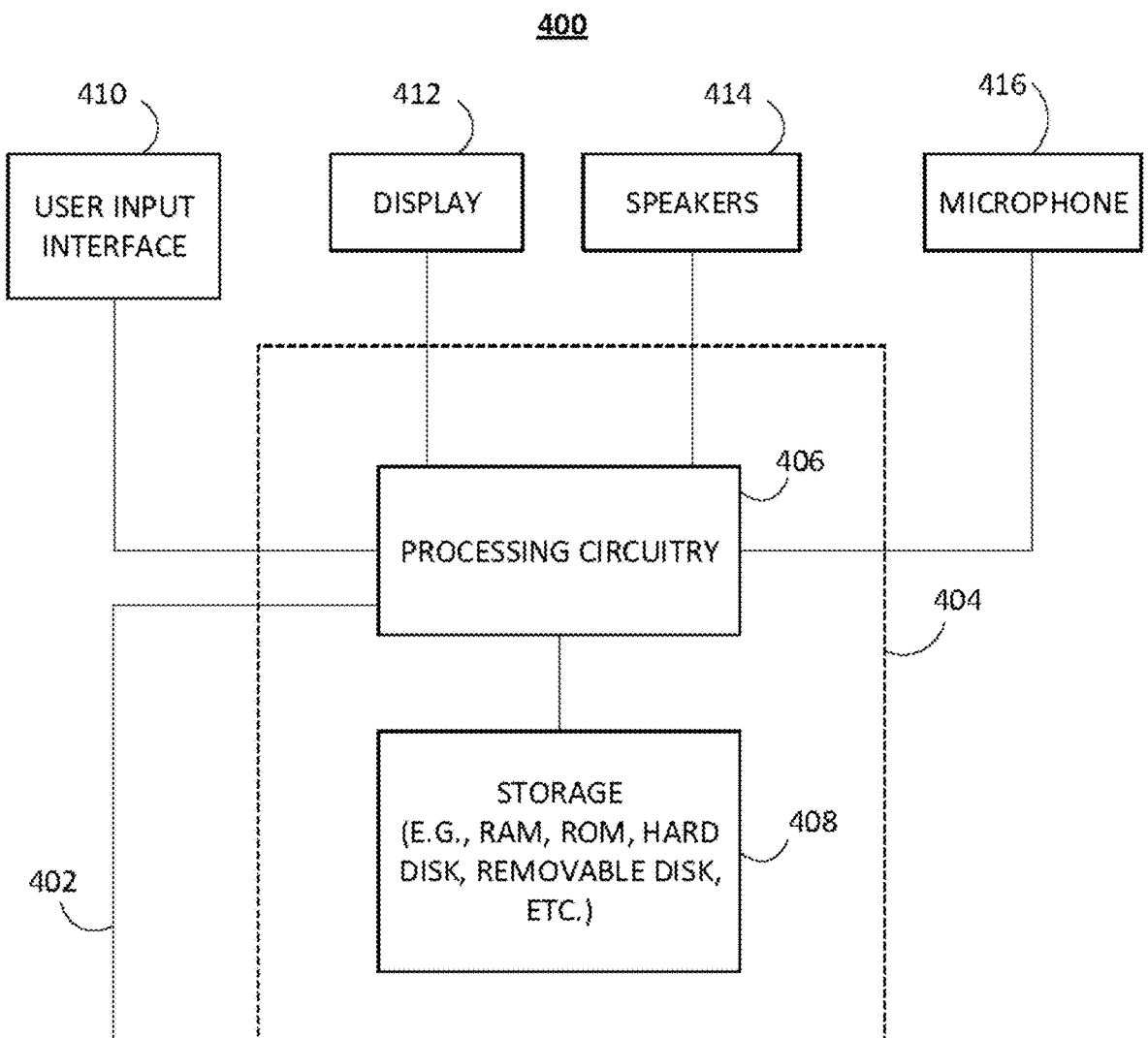
FIG. 4 shows an illustrative block diagram of a user device equipment device system, in accordance with some embodiments of the disclosure.

FIGS. 3-4 describe exemplary devices, systems, servers, and related hardware for providing spatial audio cues for notifying a user of a UI element in AR, in accordance with some embodiments. In the system 300, there can be more than one user equipment device 302 but only one is shown in FIG. 3 to avoid overcomplicating the drawing. In addition, a user may utilize more than one type of user equipment device 302 and more than one of each type of user equipment device. As described above, the user equipment device 302 may be an AR device and/or an audio output device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 306.

The user equipment devices may be coupled to communications network 306. Namely, the user equipment device 302 is coupled to the communications network 306 via communications path 404. The communications network 306 may be one or more networks including the Internet, a mobile phone network, mobile voice or data network (e.g., a 4G, 5G, or LTE network), cable network, public switched telephone network, or other types of communications network or combinations of communications networks. The path 304 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 404 can be a wireless path. Communication with the user equipment device may be provided by one or more communications paths but is shown as a single path in FIG. 3 to avoid overcomplicating the drawing.

The system 300 also includes media content source 312, and server 314, which can be coupled to any number of databases providing information to the user equipment devices. For example, media content source 312 and server 314 may have access to augmentation data, 2D and/or 3D mapping data, and similar such information. The media content source 312 represents any computer-accessible source of content, such as a storage for audio content, metadata, or, similar such information. The server 314 may store and execute various software modules for notifying of a UI element in AR using spatial audio cues functionality. In some embodiments, the user equipment device 302, media content source 312, and server 314 may store metadata associated with media content.

FIG. 4 shows a generalized embodiment of a user equipment device 400, in accordance with one embodiment. In an embodiment, the user equipment device 400, is an example of the user equipment devices described in FIGS. 1A-2C (e.g., the device 106). The user equipment device 400 may receive content and data via input/output ("I/O") path 402. The I/O path 402 may provide audio content (e.g., broadcast programming, on-demand programming, Internet content, content available over a local area network (LAN) or wide area network (WAN), and/or other content) and data to control circuitry 404, which includes processing circuitry 406 and a storage 408. The control circuitry 404 may be used to send and receive commands, requests, and other suitable data using the I/O path 402. The I/O path 402 may connect the control circuitry 404 (and specifically the processing circuitry 406) to one or more communications paths. I/O functions may be provided by one or more of these communications paths but are shown as a single path in FIG. 4 to avoid overcomplicating the drawing.

The control circuitry 404 may be based on any suitable processing circuitry such as the processing circuitry 406. As referred to herein, processing circuitry should be understood to mean circuitry based on one or more microprocessors, microcontrollers, digital signal processors, programmable logic devices, field-programmable gate arrays ("FPGAs"), application-specific integrated circuits ("ASICs"), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The notifying of a UI element in AR using spatial audio cues functionality can be at least partially implemented using the control circuitry 404. The notifying of a UI element in AR using spatial audio cues functionality described herein may be implemented in or supported by any suitable software, hardware, or combination thereof. The providing augmentation data, 2D data, and/or 3D data can be implemented on user equipment, on remote servers, or across both.

In client-server-based embodiments, the control circuitry 404 may include communications circuitry suitable for communicating with one or more servers that may at least implement the described notifying of a UI element in AR using spatial audio cues. The instructions for carrying out the above-mentioned functionality may be stored on the one or more servers. Communications circuitry may include a cable modem, an integrated service digital network ("ISDN") modem, a digital subscriber line ("DSL") modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 408 that is part of the control circuitry 404. As referred to herein, the phrase "electronic storage device" or "storage device" should be understood to mean any device for storing electronic data, computer software, or firmware, such as random-access memory, read-only memory, hard drives, optical drives, digital video disc ("DVD") recorders, compact disc ("CD") recorders, BLU-RAY disc ("BD") recorders, BLU-RAY 3D disc recorders, digital video recorders ("DVR", sometimes called a personal video recorder, or "PVR"), solid-state devices, quantum storage devices, gaming consoles, gaming media, or any other suitable fixed or removable storage devices, and/or any combination of the same. The storage 408 may be used to store various types of content described herein. Nonvolatile memory may also be used (e.g., to launch a boot-up routine and other instructions). Cloud-based storage, described in relation to FIG. 3, may be used to supplement the storage 408 or instead of the storage 408.

The control circuitry 404 may include audio generating circuitry and tuning circuitry, such as one or more analog tuners, audio generation circuitry, filters or any other suitable tuning or audio circuits or combinations of such circuits. The control circuitry 404 may also include scaler circuitry for upconverting and down converting content into the preferred output format of the user equipment device 400. The control circuitry 404 may also include digital-to-analog converter circuitry and analog-to-digital converter circuitry for converting between digital and analog signals. The tuning and encoding circuitry may be used by the user equipment device 400 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 408 is provided as a separate device from the user equipment device 400, the tuning and encoding circuitry (including multiple tuners) may be associated with the storage 408.

The user may utter instructions to the control circuitry 404, which are received by the microphone 416. The microphone 416 may be any microphone (or microphones) capable of detecting human speech. The microphone 416 is connected to the processing circuitry 406 to transmit detected voice commands and other speech thereto for processing. In some embodiments, voice assistants (e.g., Siri, Alexa, Google Home and similar such voice assistants) receive and process the voice commands and other speech.

The user equipment device 400 may optionally include an interface 410. The interface 410 may be any suitable user interface, such as a remote control, mouse, trackball, keypad, keyboard, touch screen, touchpad, stylus input, joystick, or other user input interfaces. A display 412 may be provided as a stand-alone device or integrated with other elements of the user equipment device 400. For example, the display 412 may be a touchscreen or touch-sensitive display. In such circumstances, the interface 410 may be integrated with or combined with the microphone 416. When the interface 410 is configured with a screen, such a screen may be one or more of a monitor, a television, a liquid crystal display ("LCD") for a mobile device, active matrix display, cathode ray tube display, light-emitting diode display, organic light-emitting diode display, quantum dot display, or any other suitable equipment for displaying visual images. In some embodiments, the interface 410 may be HDTV-capable. In some embodiments, the display 412 may be a 3D display. A speaker 414 may be controlled by the control circuitry 404. In an embodiment, the speaker 414 is an example of the audio output device 106 shown in FIG. 1A. The speaker (or speakers) 414 may be provided as integrated with other elements of user equipment device 400 or may be a stand-alone unit. In some embodiments, the display 412 may be outputted through speaker 414.

The user equipment device 400 of FIG. 4 can be implemented in system 300 of FIG. 3 as user equipment device 302, but any other type of user equipment suitable for notifying of a UI element in AR using spatial audio cues may be used. For example, user equipment devices such as television equipment, computer equipment, wireless user communication devices, or similar such devices may be used. User equipment devices may be part of a network of devices. Various network configurations of devices may be implemented and are discussed in more detail below.

Figure 5:
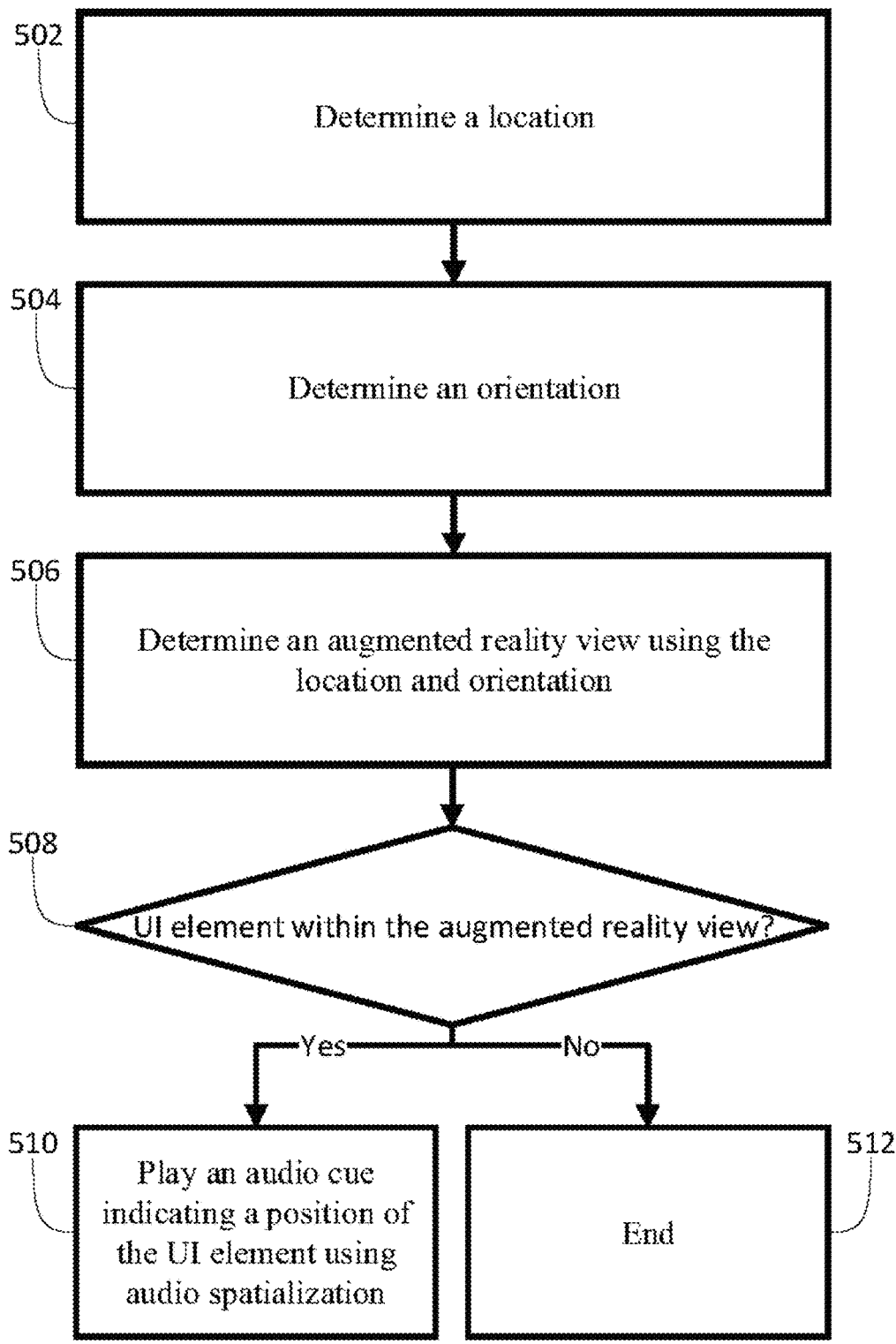
FIG. 5 is an illustrative flowchart of a process for using spatial audio cues for notifying a user of a UI element in AR, in accordance with some embodiments of the disclosure.

FIG. 5 is an illustrative flowchart of a process 500 for using spatial audio cues for notifying a user of a UI element in AR. Process 500, and any of the following processes, may be executed by control circuitry 404 on a user equipment device 400. In some embodiments, control circuitry 404 may be part of a remote server separated from the user equipment device 400 by way of a communications network or distributed over a combination of both. In some embodiments, instructions for executing process 500 may be encoded onto a non-transitory storage medium (e.g., the storage 408) as a set of instructions to be decoded and executed by processing circuitry (e.g., the processing circuitry 406). Processing circuitry may, in turn, provide instructions to other sub-circuits contained within control circuitry 404, such as the encoding, decoding, encrypting, decrypting, scaling, analog/digital conversion circuitry, and the like. It should be noted that any of the processes, or any step thereof, could be performed on, or provided by, any of the devices shown in FIGS. 1-4. Although the processes are illustrated and described as a sequence of steps, it is contemplated that various embodiments of the processes may be performed in any order or combination and need not include all the illustrated steps.

At 502, control circuitry determines a location (e.g., of a device such as the device 106 or the audio output device 108 shown in FIGS. 1A-1C). In some embodiments, the control circuitry uses location services (e.g., machine vision, global positioning systems, proximity to known wireless access points, etc.) to determine a location. In some embodiments, the location corresponds to the location of the control circuitry. In some embodiments, the location is an estimation of the location of a user.

At 504, control circuitry determines an orientation (e.g., of a device such as the device 106 or the audio output device 108 shown in FIGS. 1A-1C). In some embodiments, the control circuitry uses orientation information (e.g., position of an audio output device, data from an accelerometer, data from a compass sensor, location data, etc.) to determine an orientation. In some embodiments, the orientation is an estimation of the orientation of the user. In some embodiments, the control circuitry uses one or more inputs to estimate the orientation of the user. For example, the control circuitry may receive orientation information from an audio output device (e.g., over-ear headphones) worn by the user. The control circuitry can us the orientation information to determine the orientation of the audio output device. In some embodiments, the orientation of the audio output device is the orientation of the user's head. In another example, the control circuitry may receive location data related to the control circuitry which may be carried by the user. The control circuitry can use the location data to determine (e.g., using a global positing system) that the control circuitry is traveling in a direction (e.g., north). In some embodiments, the control circuitry estimates the orientation of the user (e.g., facing north) based on the determined direction.

At 506, control circuitry determines an augmented reality view using the location and the orientation. In some embodiments, the augmented reality view corresponds to the view that an AR device would display from the location and orientation. In some embodiments, the control circuitry receives augmentation data related to the location and orientation to determine the augmented reality view.

At 508, control circuitry determines whether a UI element is within the augmented reality view. The augmented reality view may be an estimated or predicted augmented reality view rather than an active augmented reality view that is currently generated. In some embodiments, the control circuitry uses augmentation data comprising the UI element located at a first position. In some embodiments, the augmentation data comprises a plurality of UI elements. In some embodiments, the control circuitry receives the augmentation data from a server and/or an AR device. In some embodiments, the augmentation data is stored in memory. In some embodiments, the control circuitry uses the position of the UI element and the augmented reality view determined in step 506 to determine if the UI element is within the augmented reality view. In some embodiments, the control circuitry uses a distance threshold to determine if the UI element is within the augmented reality view. For example, if the position of the UI element is not within a distance (e.g., 100 feet) of the location determined in step 502, the control circuitry determines that the UI element is not within the augmented reality view.

In some embodiments, the control circuitry uses 2D and/or 3D mapping data when determining whether the UI element is within the augmented reality view. In some embodiments, the control circuitry uses the 2D and/or 3D mapping data to determine the visibility of the UI element within the augmented reality view. In some embodiments, the control circuitry determines that the UI element is not visible in the augmented reality view because an object (e.g., building) is located between the location and the UI element. For example, the control circuitry may use 3D mapping data and the location of the UI element to map the object and UI element in 3D space then determine that the UI element is not visible from the location of the augmented reality view. In another example, control circuitry may assume that the location used to calculate the augmented reality view is at or near ground level. The control circuitry can use 2D mapping data to determine that the object is between the UI element and the location, so the UI element is not visible from the location. In some embodiments, the control circuitry receives the 2D and/or 3D mapping data from a server and/or an AR device. In some embodiments, the 2D and/or 3D mapping data is stored in the control circuitry's storage.

In some embodiments, the control circuitry uses the 2D and/or 3D mapping data to calculate a visibility score of the UI element. The visibility score may represent the visibility of the UI element in the augmented reality view from the location and orientation used to determine the augmented reality view. For example, if the entire UI element is visible within the augmented reality view, the control circuitry may calculate a high visibility score. In another example, if the entire UI element if not visible or is only partly visible in the augmented reality view, the control circuitry may calculate a low visibility score. In some embodiments, if the visibility score is below a first threshold, the control circuitry does not determine that the UI element is within the augmented reality view.

If the control circuitry determines that the UI element is within the augmented reality view, then the process 500 continues to step 510. If the control circuitry determines that the UI element is not within the augmented reality view, then the process 500 ends at step 512 and no audio cue is generated.

At 510, control circuitry plays an audio cue indicating a position of the UI element using audio spatialization. In some embodiments, the control circuitry determines a direction of the UI element in relation to the location used to determine the augmented reality view. In some embodiments, the control circuitry uses audio spatialization to generate an audio cue coming from the direction of the UI element. In some embodiments, the control circuitry applies directional audio filtering to create the perception that the audio cue is emanating from the position of the UI element. For example, the control circuitry may convert the location and/or orientation used to generate the augmented reality view into a location in a 3D audio field. The control circuitry may also convert the position of the UI element into the 3D audio field. The control circuitry can then use an audio spatialization algorithm to place the audio cue at the position of the UI element and calculate a vector (e.g., direction) emanating from the UI element. In some embodiments, the control circuitry calculates the audio spatialization using an AR software API or SDK.

In some embodiments, the control circuitry causes an audio output device to play the audio cue. In some embodiments, the audio cue is a tone, music, word, etc. In some embodiments, the control circuitry stores preferences for a profile, wherein the preferences relate to UI elements, audio cues, mode of transportation, etc. For example, a profile may indicate a first preference for UI elements related to a product (e.g., shoes, clothes, etc.). In some embodiments, the control circuitry only generates audio cues for UI elements related to the preferred product and ignores UI elements that are not related to the preferred product. For example, the control circuitry would only perform step 508 for UI elements that relate to the preferred product. In some embodiments, a second preference may indicate a preferred audio cue type (e.g., words, tone, etc.). In some embodiments, the control circuitry only generates audio cues of the certain type based on the second preference.

Figure 6:
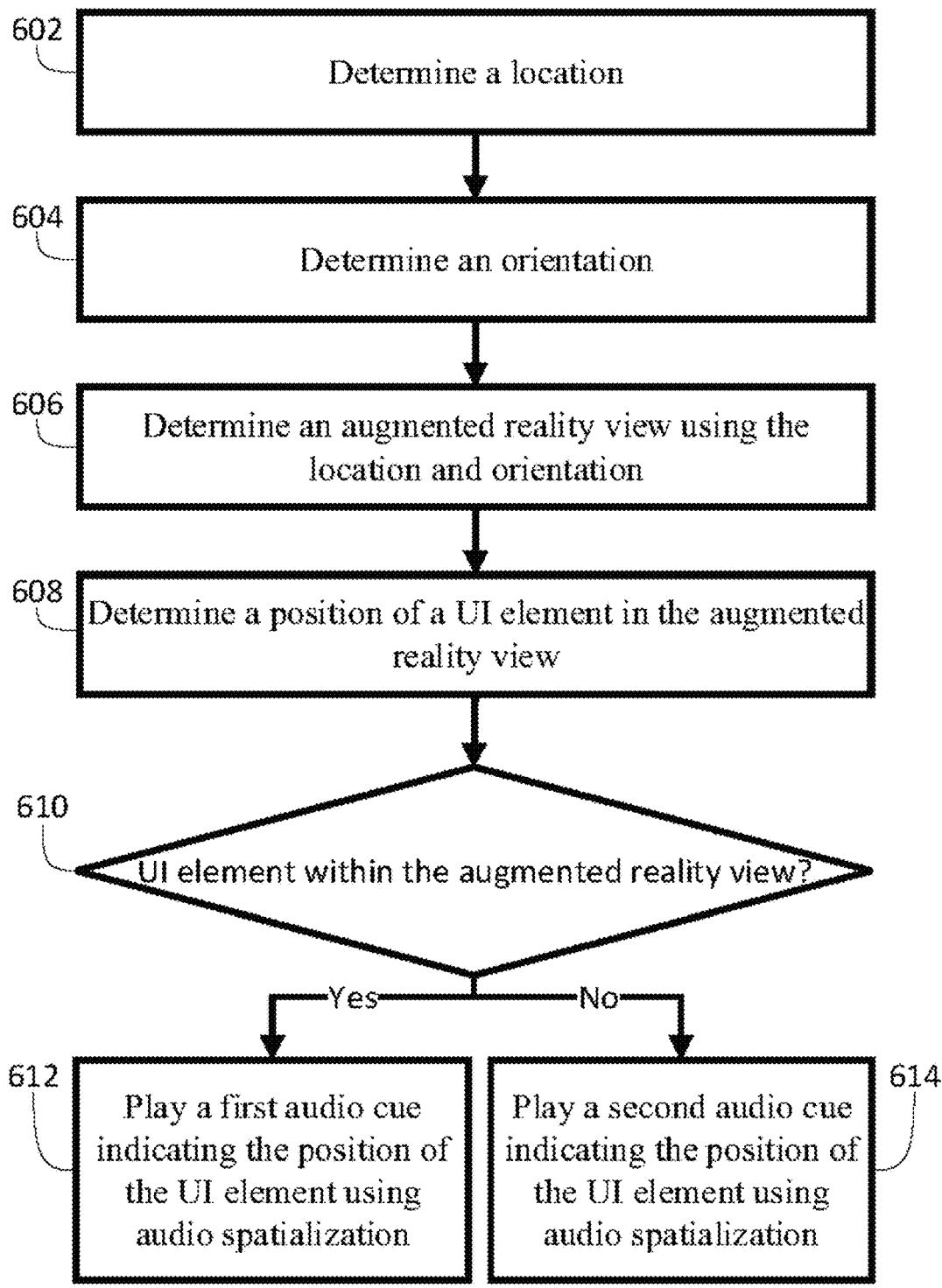
FIG. 6 is another illustrative flowchart of a process for using spatial audio cues for notifying a user of a UI element in AR, in accordance with some embodiments of the disclosure.

FIG. 6 is another illustrative flowchart of a process 600 for using spatial audio cues for notifying a user of a UI element in AR, in accordance with some embodiments of the disclosure. Like the process 500, the process 600 may be executed by control circuitry 404 on a user equipment device 400, and the user equipment device 400 may be configured in a manner similar to that described regarding the process 500 to implement the process 600.

At 602, control circuitry determines a location. In some embodiments, step 602 uses the same or similar methodologies described in step 502 above.

At 604, control circuitry determines an orientation. In some embodiments, step 604 uses the same or similar methodologies described in step 504 above.

At 606, control circuitry determines an augmented reality view using the location and orientation. In some embodiments, step 606 uses the same or similar methodologies described in step 506 above.

At 608, control circuitry determines a position of a UI element in the augmented reality view. In some embodiments, the control circuitry uses augmentation data to determine the position of the UI element. In some embodiments, the augmentation data comprises the coordinates of the UI element and the control circuitry uses the coordinates to determine the position of the UI element. In some embodiments, the augmentation data comprises a plurality of UI elements. In some embodiments, the control circuitry receives the augmentation data from a server and/or an AR device. In some embodiments, the augmentation data is stored in the control circuitry's storage.

At 610, control circuitry determines whether the UI element is within the augmented reality view. In some embodiments, step 610 uses the same or similar methodologies described in step 508 above. If the control circuitry determines that the UI element is within the augmented reality view, then the process 600 continues to step 612. If the control circuitry determines that the UI element is not within the augmented reality view, then the process 600 continues to step 614.

At 612, control circuitry plays a first audio cue indicating the position of the UI element using audio spatialization. In some embodiments, step 612 uses the same or similar methodologies described in step 510 above. In some embodiments, the first audio cue indicates that the UI element is within the augmented reality view.

At 614, control circuitry plays a second audio cue indicating the position of the UI element using audio spatialization. In some embodiments, the second audio cue indicates that the position of the UI element is outside the augmented reality view. In some embodiments, the control circuitry uses any of the techniques described herein to generate the second audio cue. For example, if the control circuitry determines that the UI element is to the right of the augmented reality view, the control circuitry generates the second audio cue to emanate from the position (e.g., from the right) of the UI element. In some embodiments, a user hears the second audio cue and perceives the second audio cue as emanating from the position (e.g., from the right), signaling the presence of the UI element. In some embodiments, the user turns toward the UI element (e.g., to the right) and uses an AR device to view the UI element. In some embodiments, an audio output device plays the second audio cue. In some embodiments, the second audio cue is a tone, music, word, etc. In some embodiments, the control circuitry stores preferences for a profile, wherein the preferences relate to UI elements, audio cues, mode of transportation, etc. In some embodiments, the first audio cue is different than the second audio cue. For example, the first audio cue may be a higher pitch than the second audio cue. In some embodiments, the control circuitry uses a first audio cue type for UI elements within the augmented reality view and a second audio cue type for UI elements outside the augmented reality view. For example, the first audio cue may be a tone (e.g., "beep") and the second audio cue may be a word (e.g., "Right").

Figure 7:
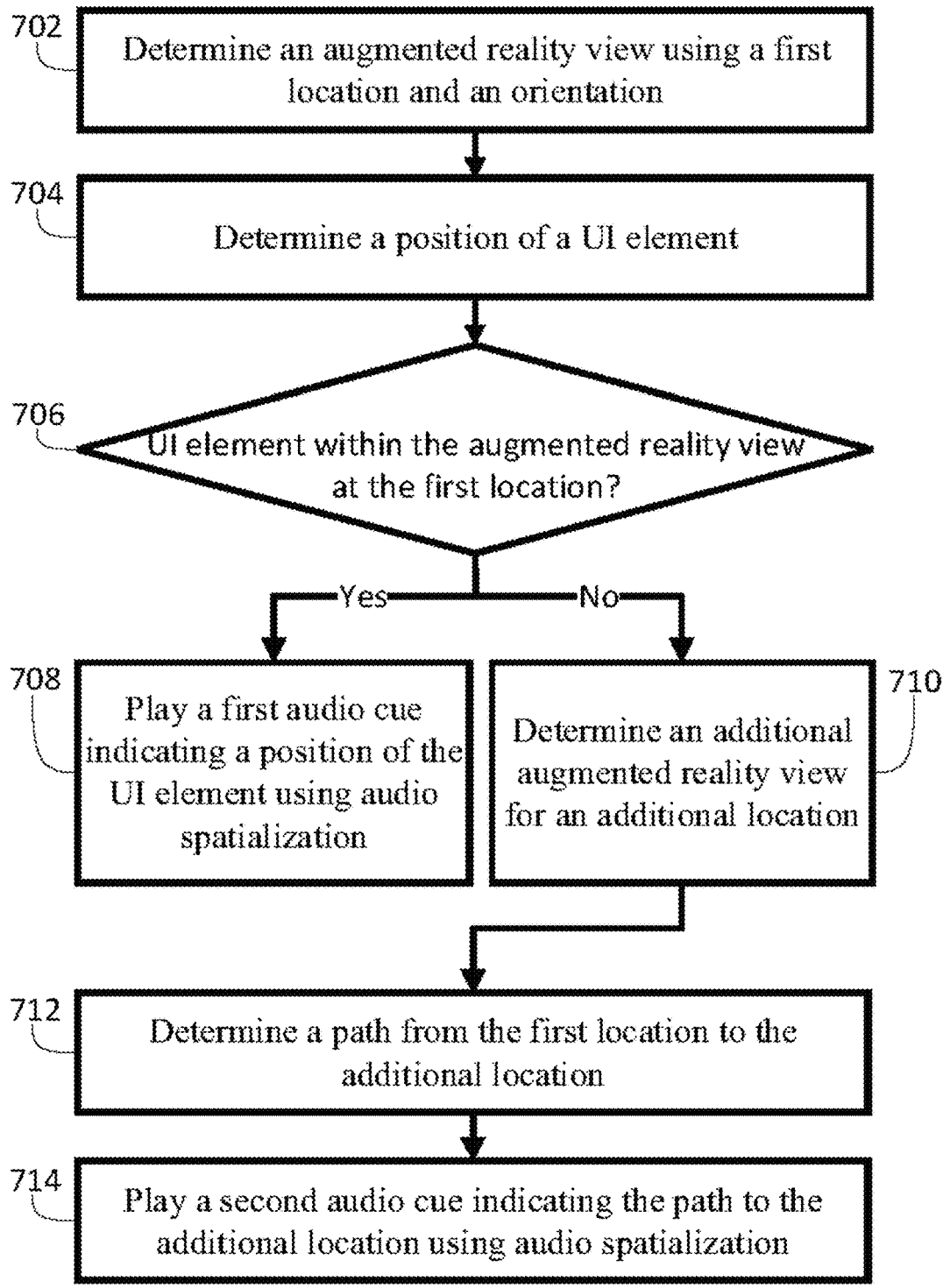
FIG. 7 is another illustrative flowchart of a process for using spatial audio cues for notifying a user of a UI element in AR, in accordance with some embodiments of the disclosure.

FIG. 7 is another illustrative flowchart of a process 700 for using spatial audio cues for notifying a user of a UI element in AR, in accordance with some embodiments of the disclosure. Like the processes 500 and 600, the process 700 may be executed by control circuitry 404 on a user equipment device 400, and the user equipment device 400 may be configured in a manner similar to that described regarding the process 500 to implement the process 700.

At 702, control circuitry determines an augmented reality view using a first location and an orientation. In some embodiments, step 702 uses the same or similar methodologies described in steps 502, 504, and 506 above. In some embodiments, control circuitry uses 2D and/or 3D mapping data when determining the augmented reality view.

At 704, control circuitry determines a position of a UI element. In some embodiments, the control circuitry uses augmentation data to determine the position of the UI element. In some embodiments, the augmentation data comprises the coordinates of the UI element and the control circuitry determines the position of the UI element using the coordinates. In some embodiments, the augmentation data comprises a plurality of UI elements. In some embodiments, the control circuitry receives the augmentation data from a server and/or an AR device. In some embodiments, the augmentation data is stored in the control circuitry's storage.

At 706, control circuitry determines whether the UI element is within the augmented reality view at the first location. In some embodiments, step 706 uses the same or similar methodologies described in step 508 above. In some embodiments, the control circuitry uses 2D and/or 3D mapping data to determine that the UI element is within the augmented reality view but is not visible from the first location because an object is located between the first location and the position of the UI element. If the control circuitry determines that the UI element is within the augmented reality view and is visible at the first location, then the process 700 continues to step 708. If the control circuitry determines that the UI element is not within the augmented reality view or is not visible at the first location, then the process continues to step 710.

At 708, control circuitry plays a first audio cue indicating a position of the UI element using audio spatialization. In some embodiments, step 708 uses the same or similar methodologies described in step 510 above. In some embodiments, the first audio cue indicates that the UI element is within the augmented reality view.

At 710, control circuitry determines an additional augmented reality view for an additional location. In some embodiments, the control circuitry uses the 2D and/or 3D mapping data to select the additional augmented reality view because the UI element is visible from the additional augmented reality view. In some embodiments, the control circuitry makes the selection based on one or more factors. The one or more factors may include distance from the first location, visibility of the UI element at the additional location, safety of the additional location, proximity to services (shops, hotels, transit, etc.) of the additional location, ease of accessibility of the additional location, user input (e.g., previous users giving positive feedback related to the additional location, and/or similar such factors. In some embodiments, the control circuitry determines a plurality of augmented reality views at a plurality of locations and determines a subset of the plurality of augmented reality views where the UI element is visible. In some embodiments, the control circuitry selects the additional augmented reality view from the plurality of augmented reality views and/or from the subset of the augmented reality views.

At 712, control circuitry determines a path from the first location to the additional location. In some embodiments, the control circuitry uses mapping techniques to determine a path to the additional location. In some embodiments, the control circuitry determines a plurality of paths and selects the path from among the plurality of paths. In some embodiments, the determined path is the fastest path to get from the first location to the additional location.

At 714, control circuitry plays a second audio cue indicating the path to the additional location using audio spatialization. For example, the control circuitry may generate an audio cue giving the user instructions (e.g., "Walk ten feet forward and five feet to your right"). In some embodiments, the control circuitry uses audio spatialization as described above to generate the audio que from the position of the additional location. In some embodiments, the control circuitry displays a graphic on a display indicting the additional location.

It is contemplated that some suitable steps or suitable descriptions of FIGS. 5-7 may be used with other suitable embodiments of this disclosure. In addition, some suitable steps and descriptions described in relation to FIGS. 5-7 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-4 could be used to perform one or more of the steps in FIGS. 5-7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    determining, at a device, a first location of the device and a first orientation of the device;
    determining an estimated augmented reality view for the device using the first location of the device and the first orientation of the device;
    determining whether a UI element is within the estimated augmented reality view for the device; and
    in response to determining that the UI element is within the estimated augmented reality view:
        determining that the UI element is not visible within the estimated augmented reality view based on the first location of the device and the first orientation of the device;
        determining a second augmented reality view where the UI element is visible, wherein the second augmented reality view corresponds to a second location of the device and a second orientation of the device;
        determining a path from the first location to the second location; and
        playing, at an audio output device, an audio cue using audio spatialization, wherein the audio cue provides one or more words comprising instructions related to the path from the first location to the second location.

2. The method of claim 1, wherein the device also uses two-dimensional and/or three-dimensional mapping when determining whether the UI element is within the estimated augmented reality view.

3. The method of claim 1, wherein the audio output device is an in-ear headphone, on-ear headphone, or over-ear headphone.

4. The method of claim 1, wherein the device determines the orientation of the device based on orientation information related to the audio output device.

5. The method of claim 1, further comprising:
receiving, at the device, a preference indicating a category of UI elements; and
determining, at the device, whether the UI element is within the category of UI elements, wherein determining whether UI element is within the estimated augmented reality view is in response to determining that the UI element is within the category of UI elements.

6. The method of claim 1, further comprising displaying a graphic indicating the second location.

7. The method of claim 1, wherein determining the second augmented reality view where the UI element is visible further comprises:
determining a plurality of additional augmented reality views where the UI element is visible, wherein each additional augmented reality view of the plurality of additional augmented reality views are associated with one or more factors; and
selecting the second augmented reality view from the plurality of additional augmented reality views based on one or more factors associated with the second augmented reality view.

8. The method of claim 1, wherein determining the path from the first location to the second location further comprises:
determining a plurality of paths from the first location to the second location; and
selecting the path from the plurality of paths because the path is the shortest path between the first location and the second location.

9. An apparatus comprising:
control circuitry; and
at least one memory including computer program code for one or more programs, the at least one memory and the computer program code configured to, with the control circuitry, cause the apparatus to perform at least the following:
determine a first location of a device and a first orientation of the device;
determine an estimated augmented reality view using the first location of the device and the first orientation of the device;
determine whether a UI element is within the estimated augmented reality view; and
in response to determining that the UI element is within the estimated augmented reality view:
determine that the UI element is not visible within the estimated augmented reality view based on the first location of the device and the first orientation of the device;
determine a second augmented reality view where the UI element is visible, wherein the second augmented reality view corresponds to a second location of the device and a second orientation of the device;
determine a path from the first location to the second location; and
play an audio cue using audio spatialization, wherein the audio cue provides one or more words comprising instructions related to the path from the first location to the second location.

10. The apparatus of claim 9, wherein the apparatus also uses two-dimensional and/or three-dimensional mapping when determining whether the UI element is within the estimated augmented reality view.

11. The apparatus of claim 9, wherein the audio output cue is played using an in-ear headphone, on-ear headphone, or over-ear headphone.

12. The apparatus of claim 9, wherein the orientation of the device is determined using orientation information related to an audio output device.

13. The apparatus of claim 9, wherein the apparatus is further caused to:
receive a preference indicating a category of UI elements; and
determine whether the UI element is within the category of UI elements, wherein determining whether UI element is within the estimated augmented reality view is in response to determining that the UI element is within the category of UI elements.

14. A non-transitory computer-readable medium having instructions encoded thereon that, when executed by control circuitry, cause the control circuitry to:
determine a first location of a device and a first orientation of the device;
determine an estimated augmented reality view using the first location of the device and the first orientation of the device;
determine whether a UI element is within the estimated augmented reality view; and
in response to determining that the UI element is within the estimated augmented reality view:
determine that the UI element is not visible within the estimated augmented reality view based on the first location of the device and the orientation of the device;
determine a second augmented reality view where the UI element is visible, wherein the second augmented reality view corresponds to a second location of the device and a second orientation of the device;
determine a path from the first location to the second location; and
play an audio cue using audio spatialization, wherein the audio cue provides one or more words comprising instructions related to the path from the first location to the second location.

15. The non-transitory computer-readable medium of claim 14, wherein the control circuitry also uses two-dimensional and/or three-dimensional mapping when determining whether the UI element is within the estimated augmented reality view.

16. The non-transitory computer-readable medium of claim 14, wherein the audio output cue is played using an in-ear headphone, on-ear headphone, or over-ear headphone.

17. The non-transitory computer-readable medium of claim 14, wherein the orientation of the device is determined using orientation information related to an audio output device.

18. The non-transitory computer-readable medium of claim 13, wherein the control circuitry is further caused to:
receive a preference indicating a category of UI elements; and
determine whether the UI element is within the category of UI elements, wherein determining whether UI element is within the estimated augmented reality view is in response to determining that the UI element is within the category of UI elements.

* * * * *